US010123171B2

(12) United States Patent
Biswas et al.

(10) Patent No.: US 10,123,171 B2
(45) Date of Patent: Nov. 6, 2018

(54) MOBILE LOCALIZED COMMUNICATION FOR ON-THE-GO USERS

(71) Applicant: Microsoft Technology Licensing, LLC., Redmond, WA (US)

(72) Inventors: Arindam Biswas, Hyderabad (IN); Lakshmi Narayana Mummidi, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

(21) Appl. No.: 15/195,400

(22) Filed: Jun. 28, 2016

(65) Prior Publication Data

US 2017/0374514 A1 Dec. 28, 2017

(51) Int. Cl.
*H04W 4/12* (2009.01)
*H04W 4/02* (2018.01)
*H04W 4/08* (2009.01)

(52) U.S. Cl.
CPC .......... *H04W 4/023* (2013.01); *H04W 4/025* (2013.01); *H04W 4/027* (2013.01); *H04W 4/08* (2013.01); *H04W 4/12* (2013.01)

(58) Field of Classification Search
CPC ....... H04W 4/02–4/028; H04W 64/00–64/006
USPC ............ 455/456.1–457, 41.1–41.3; 705/319; 709/206, 207
See application file for complete search history.

(56) References Cited

U.S. PATENT DOCUMENTS

| 9,456,043 | B1* | 9/2016 | Froment | H04L 67/22 |
|---|---|---|---|---|
| 2003/0037110 | A1 | 2/2003 | Yamamoto | |
| 2009/0066998 | A1* | 3/2009 | Kato | G01C 21/26 358/1.15 |
| 2009/0131071 | A1* | 5/2009 | Sako | A63F 13/12 455/456.1 |
| 2009/0215469 | A1* | 8/2009 | Fisher | H04L 12/588 455/456.3 |
| 2012/0254774 | A1 | 10/2012 | Patton | |
| 2014/0073362 | A1* | 3/2014 | Kawata | G06Q 10/10 455/456.3 |

(Continued)

FOREIGN PATENT DOCUMENTS

WO 2007113844 A1 10/2007

OTHER PUBLICATIONS

Voo, Brian, "5 Tips to Enhance Your WeChat Experience", Published on: Jun. 7, 2013 Available at: http://www.hongkiat.com/blog/enhance-wechat-experience/.

(Continued)

*Primary Examiner* — Allahyar Kasraian
(74) *Attorney, Agent, or Firm* — Merchant & Gould P.C.

(57) ABSTRACT

Mobile localization of communications allows users to communicate anonymously with other users who share a location that is mobile. The systems and methods provided herein distinguish users who are co-mobile from users who are merely co-located to enable mobile conversations to travel with co-mobile users without a dedicated communications connection being established beforehand between the users. The conversations travel with the co-mobile users and are not tied to a physical location, allowing for localized and anonymous communications for user who are travelling together.

19 Claims, 9 Drawing Sheets

(56) References Cited

U.S. PATENT DOCUMENTS

| | | | |
|---|---|---|---|
| 2014/0162698 A1* | 6/2014 | Han | H04W 4/00 455/456.3 |
| 2014/0337463 A1 | 11/2014 | Treu | |
| 2016/0057576 A1* | 2/2016 | Kessler | H04W 4/021 455/411 |
| 2016/0127486 A1* | 5/2016 | Chen | G06F 3/04817 709/206 |
| 2017/0171260 A1* | 6/2017 | Jerrard-Dunne | H04L 51/04 |

OTHER PUBLICATIONS

"Shoutout", Published on: Mar. 6, 2014 Available at: http://getshoutout.me/.
Arrington, Michael, "Another Proximity Based IM Service", Published on: Aug. 22, 2006 Available at: http://techcrunch.com/2006/08/22/another-proximity-based-im-service/.

* cited by examiner

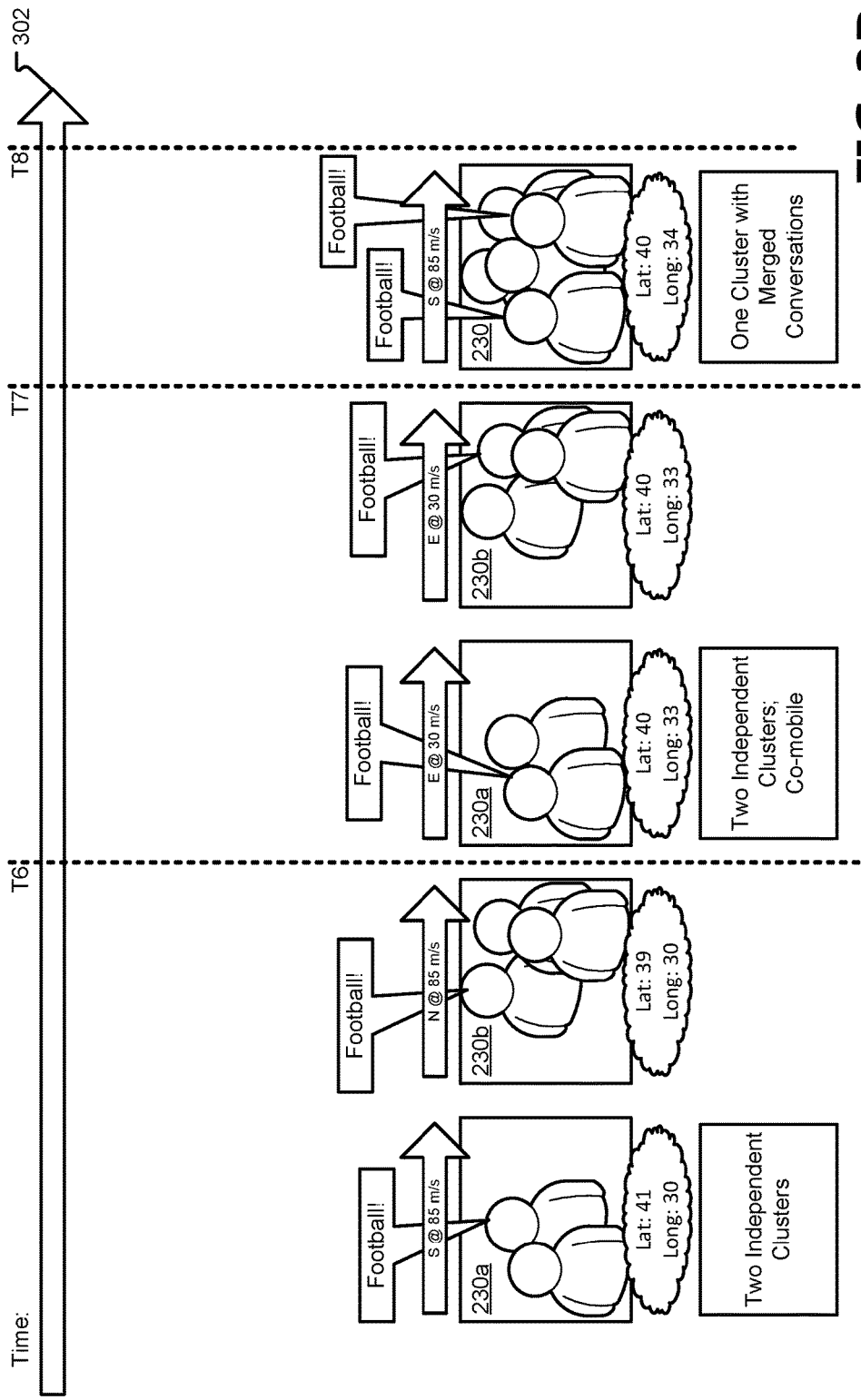

MOBILE LOCALIZED COMMUNICATION FOR ON-THE-GO USERS

BACKGROUND

Localized communications are a popular means of electronic communication that allow users within a defined location or region to communicate with one another. For example, Yik Yak, Inc. of Atlanta, Ga. provides a service by which users in a given location may post messages that are accessible to other users within that given location, but not generally to users outside of that location. The localized communications that are currently provided are tied to immobile physical spaces, such as cities, neighborhoods, campuses, and buildings. Users, however, are mobile and may travel between several regions, which current localized communications cannot handle or awkwardly handle; transitioning a user to one immobile location to another in succession and leaving their conversations as they pass through those immobile locations tethered to the immobile locations.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Users are provided with systems and methods to enable localized communications while "on-the-go." Instead of tying the user to one immobile location (or several immobile locations in succession) for localized communications, the present disclosure enables the user's communications to be localized while "on-the-go" so that a series of locations are set as the user's location for the times at which the user was at those locations, and communications can be localized thereto while the user is travelling with co-mobile users.

Users who are co-mobile share a general velocity and several locations when viewed at multiple times, which allows users who are temporarily co-located to be distinguished from those who are co-mobile. For example, if two users are waiting at the same bus stop, they may be deemed co-located (at the bus stop, in the city, etc.). However, if one user boards a north-bound bus and the other user boards a south-bound bus, they may remain considered to be co-located in the same city, but may be considered not to be co-mobile, as they are travelling in different directions. Similarly, if the first user is waiting for a bus, but the second user is on a different bus that is pausing at the bus stop, the two users may be temporarily co-located, but are not co-mobile. Conversely, if the first user and second user board the same bus, the two users may be determined as co-mobile. Various user-defined and system-defined settings may affect a determination of whether users are co-located or co-mobile, such as for example, a geographic range (e.g., within an X meter radius of another user), a velocity differential (e.g., traveling in the same general direction and at the same general speed as another user within Y degrees of arc and X meters per second), and a contact time (e.g., sharing a geographic range and velocity for at least X seconds).

Mobile localized conversations may fork and recombine as users cease traveling with the conversation or as users begin (or rejoin) traveling with the conversation. Conversations may be branched based on activity levels, numbers of co-mobile users, and the seniority of users in the conversation, among other factors. In various aspects, such mobile localized conversations are provided in addition to or instead of immobile localized conversations, and may be persisted for a one-time participant to remain part of a conversation although no longer traveling with the conversation.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIG. 3B illustrates a timeline in which conversations may be joined or rejoined when multiple conversations become co-mobile;

DETAILED DESCRIPTION

Figure 1:
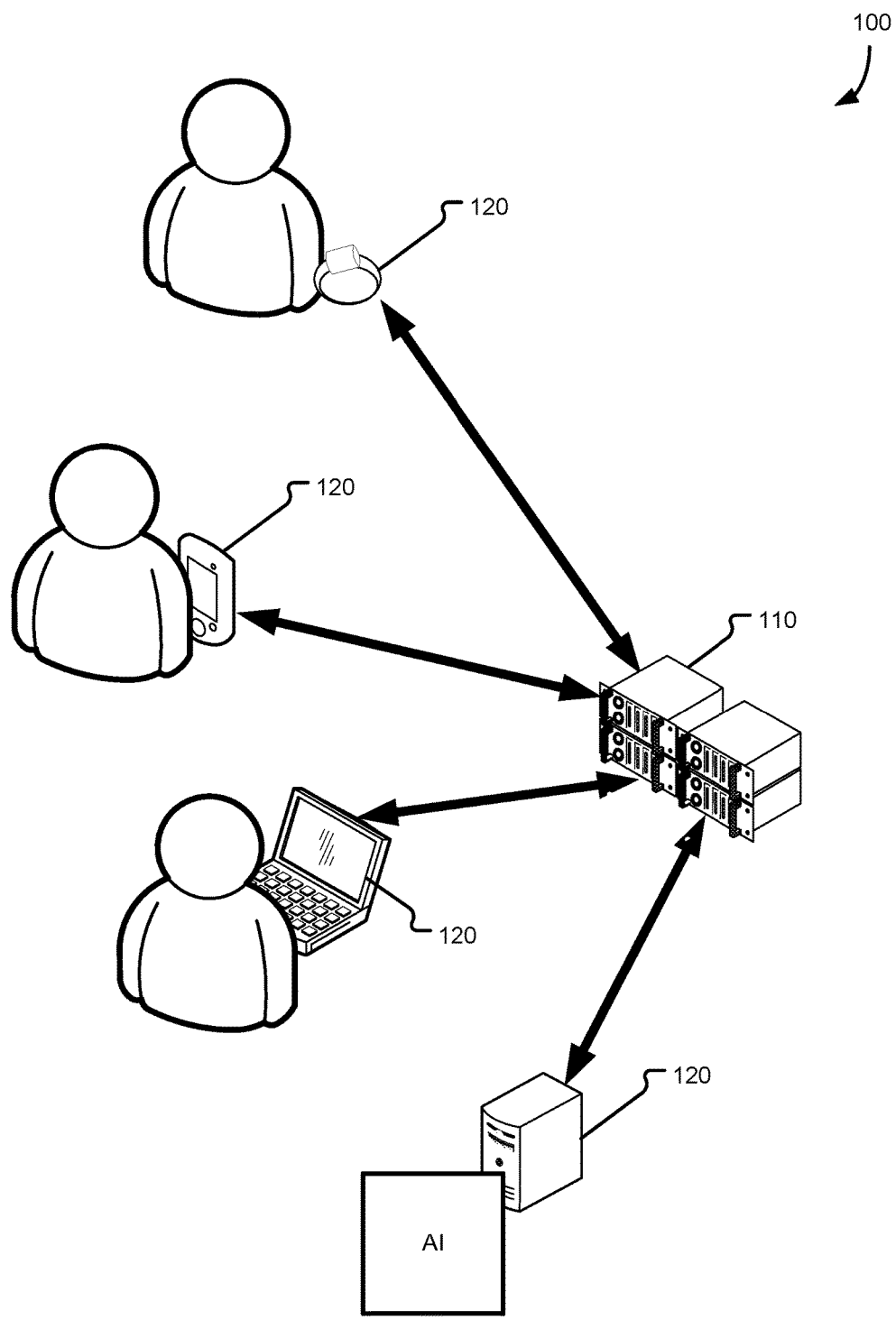
FIG. 1 is a block diagram showing the example components of an example system to enable mobile localized communications.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

FIG. 1 is a block diagram showing the example components of an example system 100 to enable mobile localized communications. As illustrated, a conversation server 110 is in communication with one or more user devices 120. Although not illustrated, one of skill in the art will appreciate that various servers and intermediaries in a network may lie between the user devices 120 and the conversation server 110 to route the message between the users and the system 100. As will also be appreciated, although some components of the example system 100 are illustrated singly, in various aspects multiple copies of those components may be deployed, for example, for load balancing purposes, redundancy, or offering multiple services.

The communication server 110 and user devices 120 are illustrative of a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, printers, and mainframe computers. The hardware of these computing systems is discussed in greater detail in regard to FIGS. 5, 6A, and 6B. User devices 120 may be operated by humans or by automated systems (i.e., "bots") to participate in the conversations. A user device 120 operated by a bot may be a virtual device operating on or in communication with the communication server 110 to provide responses to human queries in the mobile localized conversations. For example, an instance of the SIRI®, GOOGLE NOW™ or CORTANA® electronic assistant (available from Apple, Inc. of Cupertino, Calif., Alphabet, Inc. of Mountain View, Calif., and Microsoft, Corp. of Redmond, Wash., respectively) may provide answers regarding traffic, weather, news items, etc. that are localized to on-the-go users participating in a mobile localized conversation.

The communication server 110 runs a check every '$s_1$' seconds to determine whether to convert static localized conversations into mobile localized conversations; moving or dynamically localized conversations that are available to users who are co-mobile. Once the conversation is localized for a mobile setting, the location of the conversation is updated every '$s_2$' seconds so that the co-mobility of users can be determined. In various aspects, the communication server 110 uses a clustering algorithm (e.g., k-means) on the list containing locations of the last activities (e.g., messages, refresh requests, setting changes) received in the last $s_2$ seconds of all the active users to get the new location of a conversation and to determine which users are co-mobile. The current and historic location data from the users and/or current location data and current velocity data may be used in the clustering algorithm to cluster users who are co-mobile.

On the client side, the user device 120 periodically provides the location and/or velocity of the user device 120 (and thereby, the location and velocity of the associated user). The user device 120 may provide this information on its own (including whenever a new message is sent) or may be polled by the communication server 110. The expected time at which the user will cross the threshold distance ('d' meters) of an existing conversation is calculated, or when a user creates a new conversation, the co-mobile users who are already within its threshold are determined. A lower bound of 'L' seconds is used to estimate when a user is first expected to cross the threshold and be eligible to enter the conversation, and an upper bound of 'u' seconds for crossing the threshold is also generated, at which time the next location provision/polling is done to verify whether the user is eligible to see or enter the conversation. In various aspects, the provision/polling frequency may be matched to the speed of travel for a device, such that user devices 120 moving at a higher speed provide or are polled to provide their location and/or velocity information more frequently than devices moving at a lower speed.

When the conversation is mobile, it remains accessible to all existing participants of the conversation even if they are not in the vicinity of the conversation's new location (at least until a timeout occurs), and may be made accessible to new participants who are in the vicinity of the new location (e.g., within d meters of the expected epicenter of the conversation at time L and/or time u as estimated according to the velocity of the conversation and the user from time L or polled/provided at time u). Existing participants who are no longer co-mobile with the conversation may time out and lose access to the conversation when they remain inactive for significant amount of time. Conversely, when a new user becomes co-mobile with the conversations, those conversations can be seen and joined by the new user when it is determined that the new user is co-mobile.

In some aspects, a prospective member of the conversation may transmit a route (e.g., a subway line, road, hiking trail) and a time period to discover conversations taking (or having taken) place along that route at the specified times. The prospective member can join these conversations once they become co-mobile with the conversation, and in some aspects may be provided read-only access until they become co-mobile, or may be treated as virtually co-mobile with full read and write access to the available conversations that are mobile localized along the route at the specified times. For example, a user may submit a train route that is used for a daily commute and may see conversations that are mobile along that route to see what the users traveling along that route are talking about (e.g., is a given train crowded, are there several people interested in talking about sports/politics/television/gossip/etc. on a given train). In various aspects, prospective members have read-only access to the conversations that are mobile along the route, while in other aspects a prospective member may post new topics as queries but may not respond, while in yet other aspects, prospective members may read and write to mobile localized conversations as though they were co-mobile. For example, an operator of a transportation system (e.g., a port authority, a municipal controller) may know the routes that its transports take (e.g., bus routes, train lines, ferry routes) and the times therefor, and specify these locations and times instead of its actual physical locations at the given times. By using localization settings for the known routes and times the operator may participate (with either a human user or an artificial intelligence user) in mobile localized conversations that are localized to a given transport (e.g., bus, train, ferry) from a central office to provide riders with helpful travel information or respond to rider queries while only being virtually co-mobile with the riders.

A conversation, as discussed herein, is an electronic ad hoc communication. Users may make use of text, hyperlinks, and inserted content (e.g., videos, emoji, images, sound files) to communicate with one another in the conversation. Users may remain anonymous or use a username, "handle", and/or avatar to identify individual users. These conversations are hosted by the communication server 110 and are accessible by the various user devices 120. Each conversation may have a topic, such as for initial and subsequent user posts, content tags (e.g., subject matter tags: sports, weather, safety; popularity tags: number of unique users, speed of posting, number of posts; recency tags: latest post made, first post made) and various settings for how other users are to be determined to be co-mobile (e.g., range, duration, private/public). Conversations may have a set duration, so that after no users have participated in a given amount of time, the conversations will time out, and may be deleted, overwritten or archived by the communication server 110.

A user of a user device 120 will post a conversation to the communication server 110 for mobile localization, and the communication server 110 will determine which other users are clustered into a co-mobile group with the posting user. Those co-mobile users will have access to the conversations, and may view the conversation, make additions to the conversation, and may post their own conversations. The user device 120 may run a special application used to find, access, and make mobile localized communications, or an application used for other purposes may provide such mobile localized communications in addition to other communications.

Conversations on the communication server 110 may be moderated or may be unmoderated. Moderated conversations may be administrated by a human user, an artificial intelligence (AI), or content filters to restrict the content and users who are part of the conversations.

Figure 2:
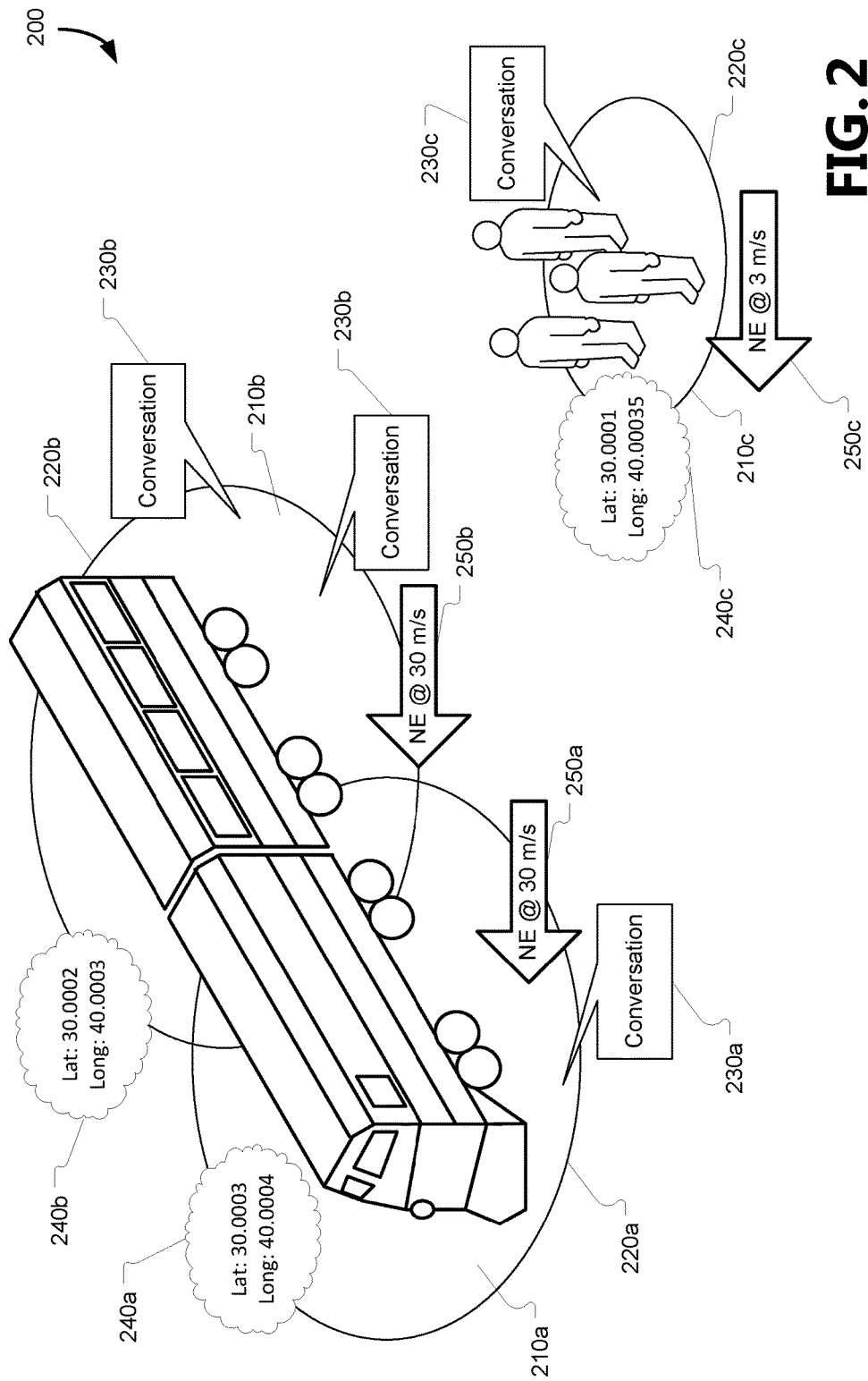
FIG. 2 illustrates a scene in which several groupings of users involved in mobile conversations are shown to introduce terms relevant to determining whether one or more users are co-located or co-mobile.

FIG. 2 illustrates a scene 200 in which several groupings of users involved in mobile conversations are shown, to introduce terms relevant to determining whether one or more users are co-located or co-mobile. Three conversational clusters 210 (specifically, 210a, 210b, 210c) are illustrated in FIG. 2, but one of ordinary skill will recognize that these clusters 210 are provided as non-limiting examples. For example, a bus or train may be a mobile location when multiple users are traveling on that bus or train, but a group of people who are walking together may also form the basis for a mobile localized conversation. The present disclosure is applicable to mobile communications regardless of the means by which the communications are brought on-the-go with the users. As will be appreciated, similar components will be referred to by similar numbers, but when discussed specifically will be provided a shared letter designator to distinguish them from each other and to show sub-elements related to a given instance.

Each conversation cluster 210 sets a region 220 in which localized conversations 230 are visible to users who are co-mobile. Localized conversations 230 are visible to the users within the region 220 of a hosting cluster 210, but are not visible to users outside of that region 220. For example, users may be part of more than one conversation cluster 210 at a time, such as, for example, a user located in the overlapping regions 220a and 220b of the first cluster 210a and the second cluster 210b. Users who are in the third cluster 210c, however, cannot see the conversations in the first cluster 210a or second cluster 210b, and vice versa. If, however, the users in the third cluster 210c moved within the range 220 of the other clusters 210, they may join the conversations 230 hosted in those clusters 210. Each cluster 210 is tracked by location information 240 and velocity information 250 to compare to the locations and velocities of individual users to determine when they are co-mobile.

As will be understood, the term "co-located" designates that two persons/objects share a location at a given point in time. For example, when the location is set as a city, two persons who are located on opposite sides of that city at a given time are considered to be co-located with each other at that given time. The term "co-mobile," however, designates that two persons/objects are travelling together over a period of time; they share a location and a velocity at a given time (or times) or share several locations at several times. For example, two riders on the same bus, train, boat, airplane, etc. or walking with the same group, may be considered co-mobile because they pass through (roughly) the same locations at (roughly) the same times. For example, a rider in the front left of the bus and a rider in the back rear of the bus will, depending on the level of precision in gathering their location information, not pass through the exact same points at the exact same times, but may be considered co-mobile due to localization settings allowing for slight variations in the collected data when determining which users are co-located.

Location information may be collected as GPS (Global Positioning System) coordinates, latitude/longitude/altitude coordinates, cell tower locational coordinates, presence data (e.g., hallway 1, conference room B12) on a campus or building, combinations thereof, and may be based on other locational or positioning systems available to users. These coordinates are sent via the devices used by the on-the-go users to the conversation server 110 and may be used to determine the velocity information (by collecting such locational information over time and deriving the velocity information) or accelerometers in the users' devices may provide the velocity information for a given instant. The velocity information therefore represents historical locational information, and the system is free to use historical locational information or instant velocity information when determining whether users and conversations are co-mobile.

The users who participate in the conversation, or who could participate in the conversation, that share location information 240 and velocity information 250 in common over time are considered to be co-mobile and may see and participate in each other's mobile localized communications 230; they form the clusters 210. As will be appreciated, variations in this information may be set by users or the system in localization settings to allow for various ranges 220 of communication groupings, measurement errors, precision differences, etc. For example, travelers on a bus may each be in separate seats, and will therefore have slightly different location coordinates, but these slight variations may be accounted for in a level of precision to determine that the users are "co-mobile." As will be appreciated the level of precision may also be tuned finely, such that conversations may be limited to a cabin, car, or other segment of a co-mobile population (e.g., location data is used to limit a conversation to the first class riders, the tail end of a tour group).

In different aspects, a location range preference may be set from a given user, a user cluster, or each user. For example, communications may be discoverable once a new user enters within d meters of an initial user when the range preference is set by a given user or within d meters of any conversing user when the range preference is set by each user. Alternatively, the system may determine a central location from amongst all of the conversant users to determine the range 220 into which a new user must enter to see and participate in the conversation. In various aspects, the range 220 may be set as a radius or as bounds to a non-circular/spherical range for localization. As will be appreciated, as the users who are part of the conversation are mobile, the conversation server may allow for a range to trail the users' current locations and may predict where the range will travel (based on the users' velocity and external route data) to more quickly determine when new users are within the range 220. For example, a train full of co-mobile users may take a snaking path, such that users in a front car are travelling in a different direction than users in a trailing car, but the users may be determined as co-mobile based on a trailing range from the front car, or a predicted range from the rear car.

Figure 3A:
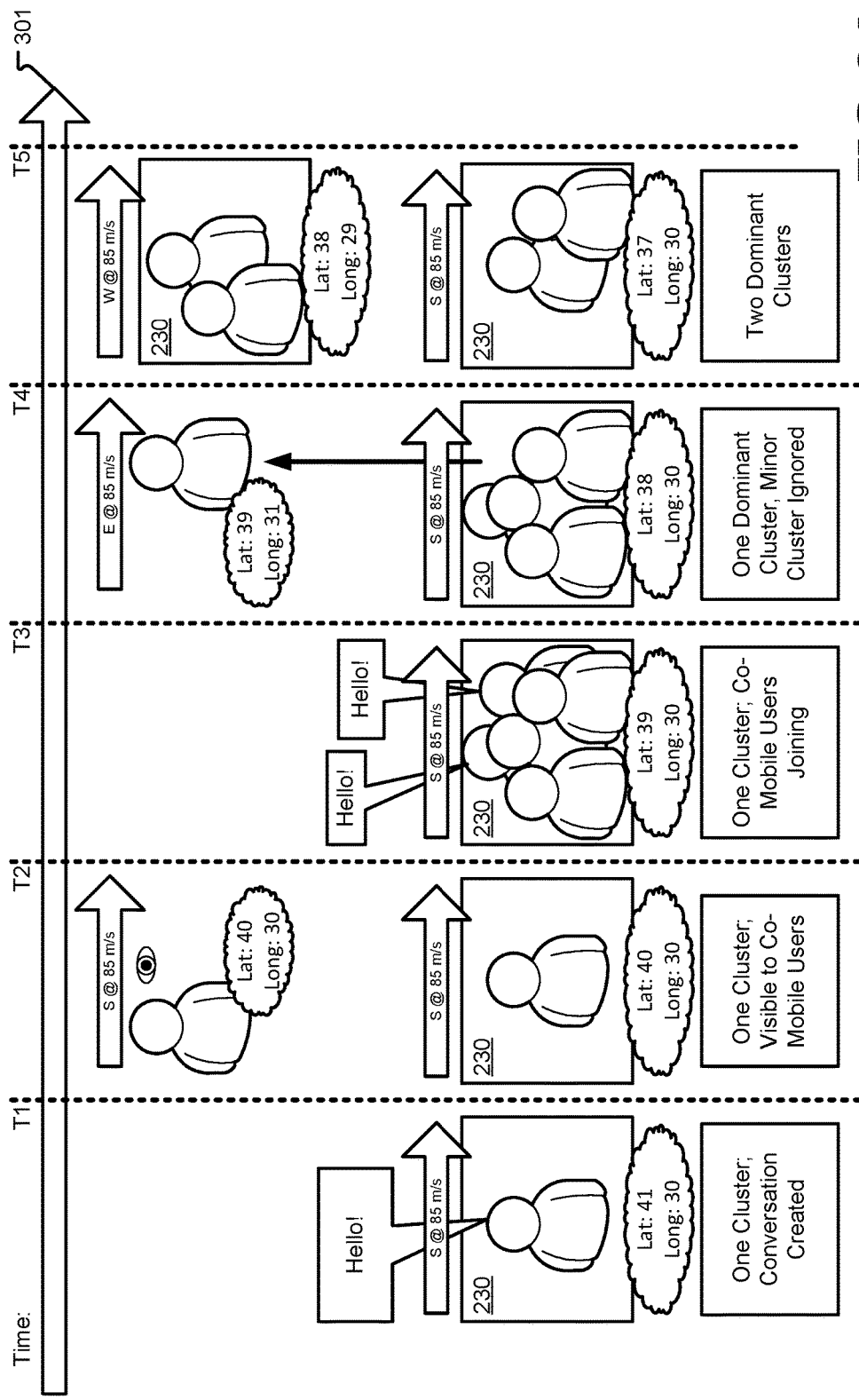
FIG. 3A illustrates a timeline in which users join and leave a conversation to illustrate forking a conversation.

FIG. 3A illustrates a timeline 301 in which users join and leave a conversation to illustrate forking a conversation. When a conversation is started at T1 by a first user, other users who are co-mobile with the first user may see that conversation at T2 and join the conversation at a later time T3. In various aspects, a conversation may "time out" and be deleted if other users have not joined the conversation after a preset amount of time, or if the first user allows the conversation to go idle for a preset amount of time.

Once more than one user is part of the conversation, the location of the conversation is tracked at various points in time so that at later times (T2 and onward) when more users become co-mobile with the conversation, they can see and join the conversation.

When a user is no longer co-mobile with the conversation, such as when a user disembarks from the platform on which the users are co-mobile, the disembarked user may be removed from the conversation, may fork the conversation, or may elect to remain a remote participant in the conversation. For example, user may wish to continue a conversation begun while co-mobile when that a user is no longer co-mobile. In various aspects, the conversation forks based on an activity level of the users, a number of active users, a seniority of the active users, and other factors.

When an activity level is used as a forking factor, the user or users who have participated the most in the conversation will be determined so that an activity level will be used to decide whether to fork the conversation or allow the user to remain part of the conversation when they are no longer co-mobile. For example, if a mobile localized conversation is travelling with an airplane, when the passengers disembark, the conversation will follow the journey of the users who (alone or collectively) were most active in the conversation. If multiple users or groups of users meet an activity threshold, the conversation will fork, so that there are two dominant conversations that may remain mobile. If a user or a group of users are not co-mobile with a dominant conversation, they may be removed from the conversation or may specify that they wish to remain part of the conversation remotely despite no longer being co-mobile with it.

When a participating number for a group of users is used as a forking factor, when one or more users are no longer co-mobile with the original conversation, their number may be used to determine whether to continue the conversation in a new co-mobile environment. For example, if a walking tour group breaks into two smaller groups, where X persons are in a first group and Y persons are in the second group, a conversation started in the main group may become two conversations if X and Y exceed a user threshold for forking. Alternatively, if X or Y does not exceed a user threshold, users in the group above the threshold may continue the conversation as a single conversation and the users in the group below the threshold will leave the conversation. When neither group exceeds a user threshold, the conversation may end or alternative forking factors may be used to determine how the conversation is to remain mobile.

When a seniority level is used as a forking factor, a conversation may follow a "creator" or group of users who have been part of the conversation for the longest, or are the most recent users in the conversation. For example, a user may post a topic for a conversation, which will follow the user as other users join and leave co-mobile status with that user.

Each child conversation that forks from a parent conversation will retain the previous messages comprising the parent conversation, but new messages will be unique to the given child conversation and will be from the users who are co-mobile with the child or elected to remain part of the given child despite no longer being co-mobile with it. The velocity and location of each child will be tracked separately to determine which users are co-mobile with it. In various aspects, the parent may be considered one of the children so that n−1 new conversations need to be created, where n is the number of children forked from the parent conversation.

As an example, at T4 one user from the conversation is no longer co-mobile with the conversation; that user is not travelling with the dominant cluster of users participating in the conversation. In various aspects, the conversation may remain visible to the user for a set period of time, but as illustrated, that user is a minor cluster (for at least one of the various reasons described above) and the conversation is not forked.

As an alternate example, at T5 several users from the conversation are no longer co-mobile with the conversation, but are co-mobile with each other. In this example, two dominant clusters are identified by the conversation server 110 for at least one of the various reasons discussed above, and the conversation will fork. Each of the users participating in a fork may see the other fork for a set period of time and elect to join one fork or the other (even if not co-mobile therewith) or to stay part of multiple forks.

FIG. 3B illustrates a timeline 302 in which conversations may be joined or rejoined when multiple conversations become co-mobile. When two or more conversations that are not co-mobile at time T6 are determined to be co-mobile at time T7, those conversations become visible to the users who are participating in the other conversation. In various aspects, if it is determined that the two conversations were children of the same initial parent conversation or otherwise deal with the same topic(s), the conversations may be merged at time T8. In various aspects, when the conversations are merged, the communication server 110 may perform a mail merge operation on the two conversations and collect any future messages in the conversations in a single conversation. In some aspects, the user devices 120 may be transmitted all or a portion of the historically made comments from the other conversation for display in a merged history, and any messages from the other conversation may be visually indicated on the user device 120 as from a different conversation fork (e.g., with an indicator, a different color, or on a new tab in the conversation history). In other aspects, to conserve mobile bandwidth for the users, the historical comments from the other conversation will not be transmitted to a given user device 120 until requested by the associated user, and the user may see the participants from the other conversation as they were new participants to the user's initial conversation.

Figure 4:
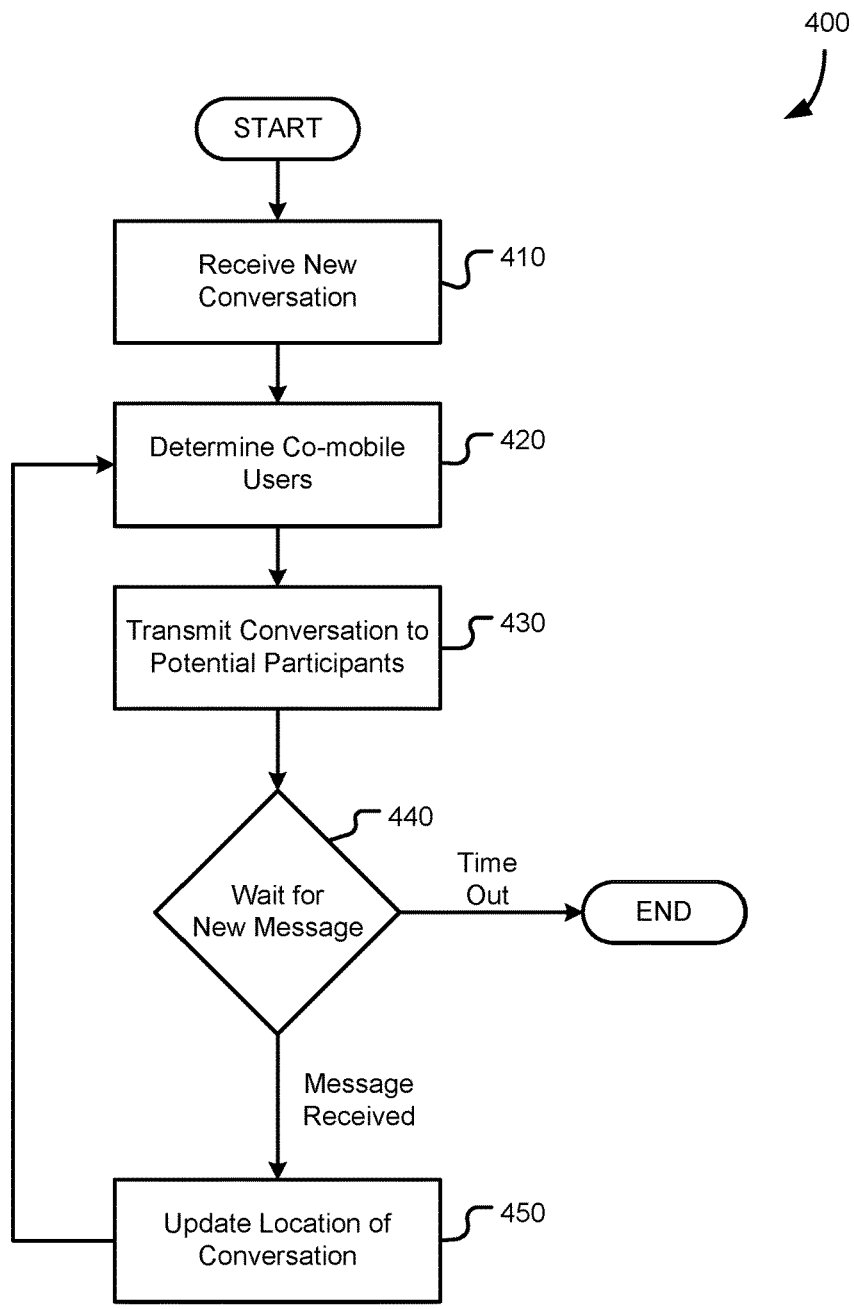
FIG. 4 is a flow chart showing general stages involved in an example method for enabling mobile localized communications for users who are "on-the-go"

FIG. 4 is a flow chart showing general stages involved in an example method 400 for enabling mobile localized communications for users who are "on-the-go." Method 400 begins at OPERATION 410 where a signal is received by the communication server 110 to start a new conversation. Such a signal will include an initial location from which the signal was sent from a creator using a user device 120 to start a mobile localized conversation, and may include a title, content tags, an initial message, message settings, and velocity data for the user device 120. In some aspects, tags will be automatically generated and modified or deleted by the communication server 110 as the conversation unfolds based on content analysis of the conversation.

Method 400 proceeds to OPERATION 420, where the communication server 110 determines, based on the creator's location information, the message settings (or default settings) and the location information of other users which other users are co-mobile with the creator. Users who are co-mobile may be co-located and share similar velocity data (e.g., are within a given range of the message's velocity), or may be co-located across several times with the message (e.g., both at location A at time X, location B at time Y, at location C at time Z, etc.).

At OPERATION 430 the communication server 110 transmits the conversations to potential participants of the conversation. In various aspects, the communication server 110 may transmit a list of available conversations that are localized to the users that are co-mobile with those conversations in a condensed format (e.g., a topic, title, a preview) so that the participating or joining user can choose which conversations to participate in. Users who are co-mobile do not need to be active in a given conversation to be considered a potential participant; co-mobile users may browse available conversations and choose whether to fully participate. Full participants receive the messages from co-mobile users who are also participants (e.g., their replies) and may remain full participants after no longer being co-mobile with the conversation. Full participants are considered potential participants until they opt out of the conversation or time out of the conversation by not responding or otherwise indicating their interest in the conversation for a predetermined length of time. In various aspects, when a given conversation is transmitted to a full participant, only the new messages or edits to previous messages made by other users in the conversation are transmitted to the participant, and the user device 120 of the full participant will build the conversation thread from the individual messages received.

Method 400 then proceeds to DECISION 440 to wait for a new message in the conversation for a designated amount of time. When the communication server 110 does not receive a message within a designated time, the conversation will time out, and may be deleted (or be designated for overwriting), archived, or otherwise be made unavailable, and method 400 will conclude. When the communication server 110 does receive a message during the designated time period, method 400 will proceed to OPERATION 450.

At OPERATION 450 the communication server 110 updates the location of the conversation based on the location information received with the latest message. In various aspects, velocity information and/or estimated velocity information from previous location information is used to plot a location in the future. Method 400 then returns to OPERATION 420, where the newly updated location is used to determine which users are co-mobile with a conversation. Method 400 may continue this loop until the user loses interest in the conversation and it times out at DECISION 440.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
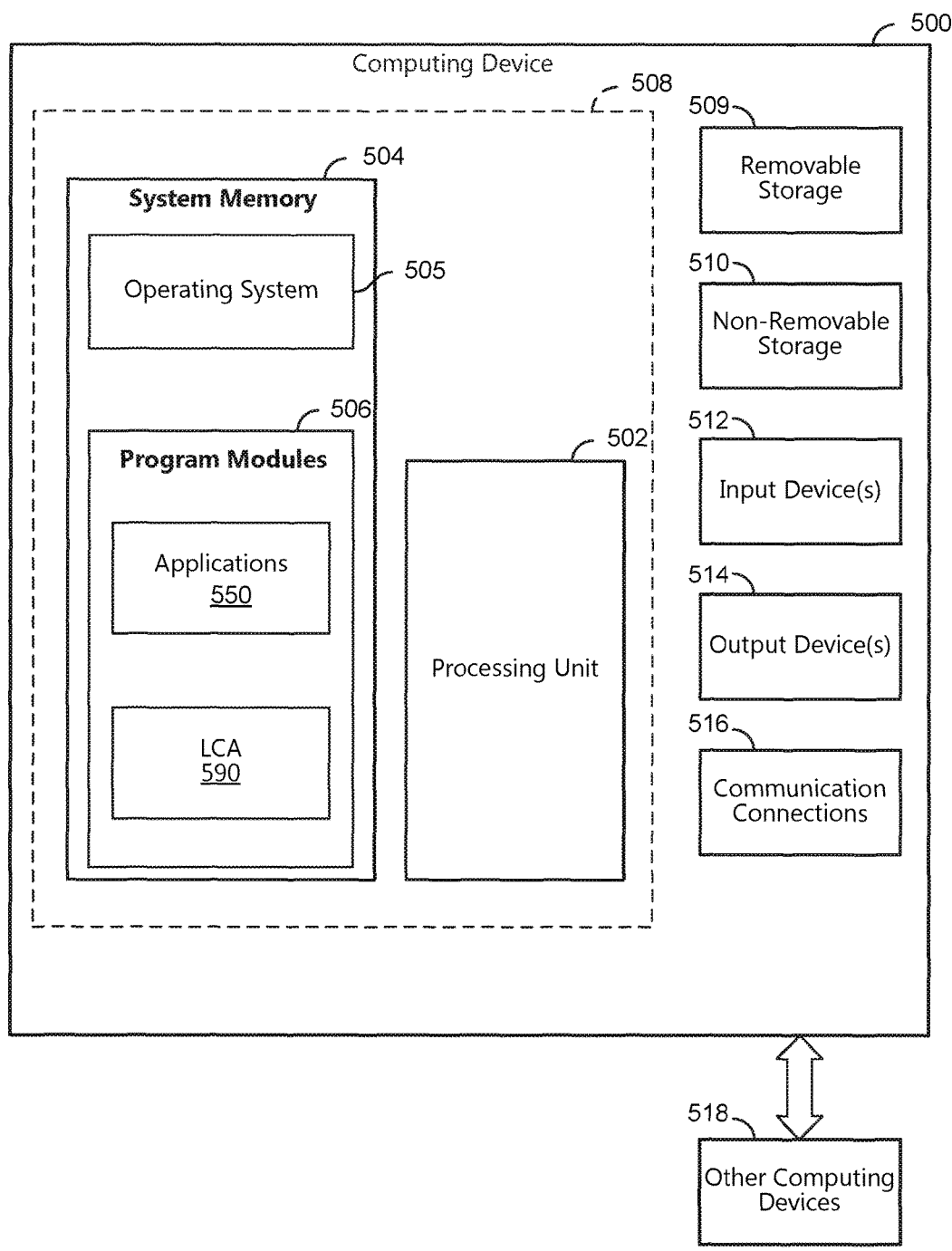
FIG. 5 is a block diagram illustrating example physical components of a computing device.
Figure 6A:
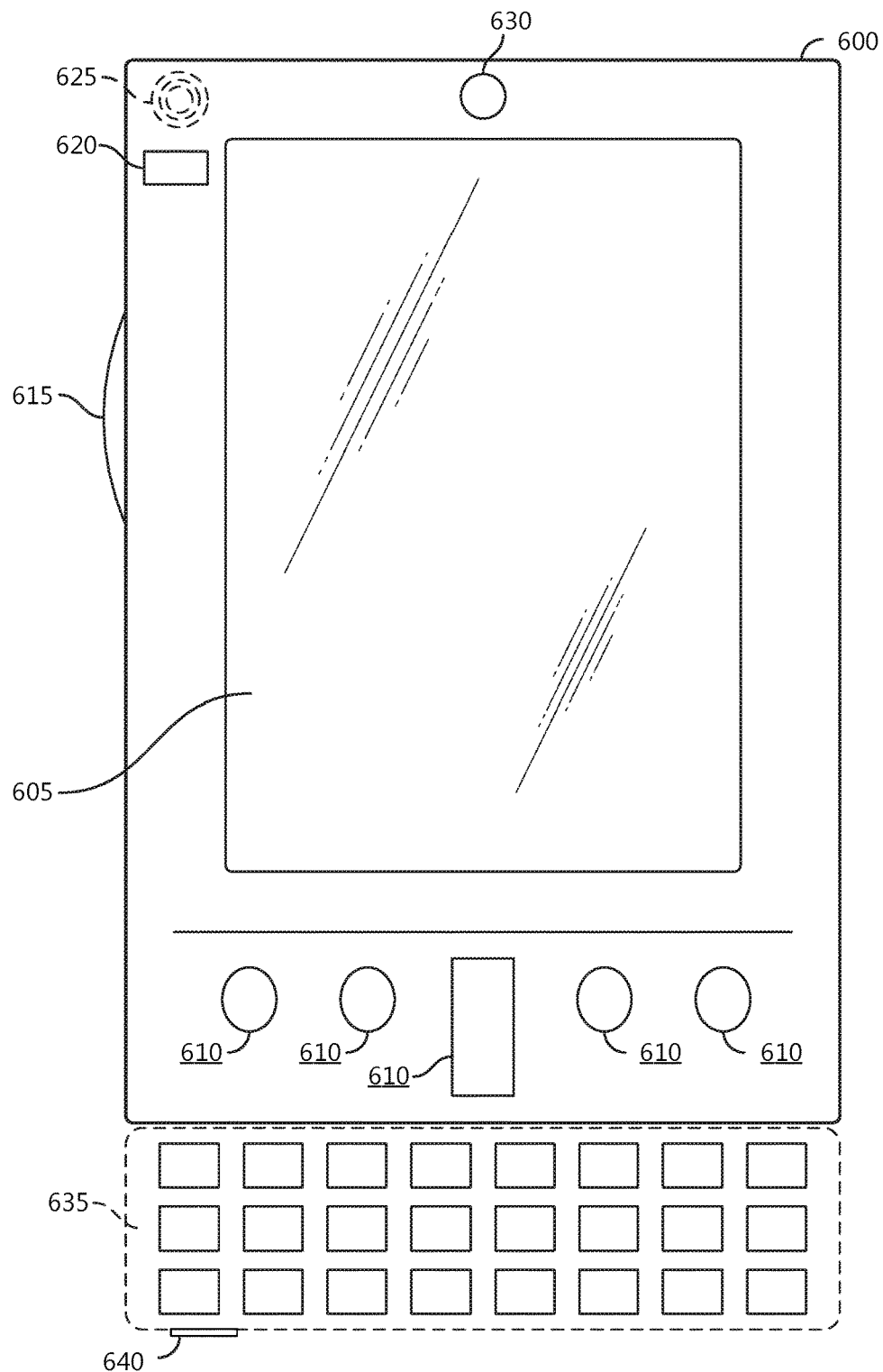
FIGS. 6A and 6B are block diagrams of a mobile computing device.
Figure 6B:
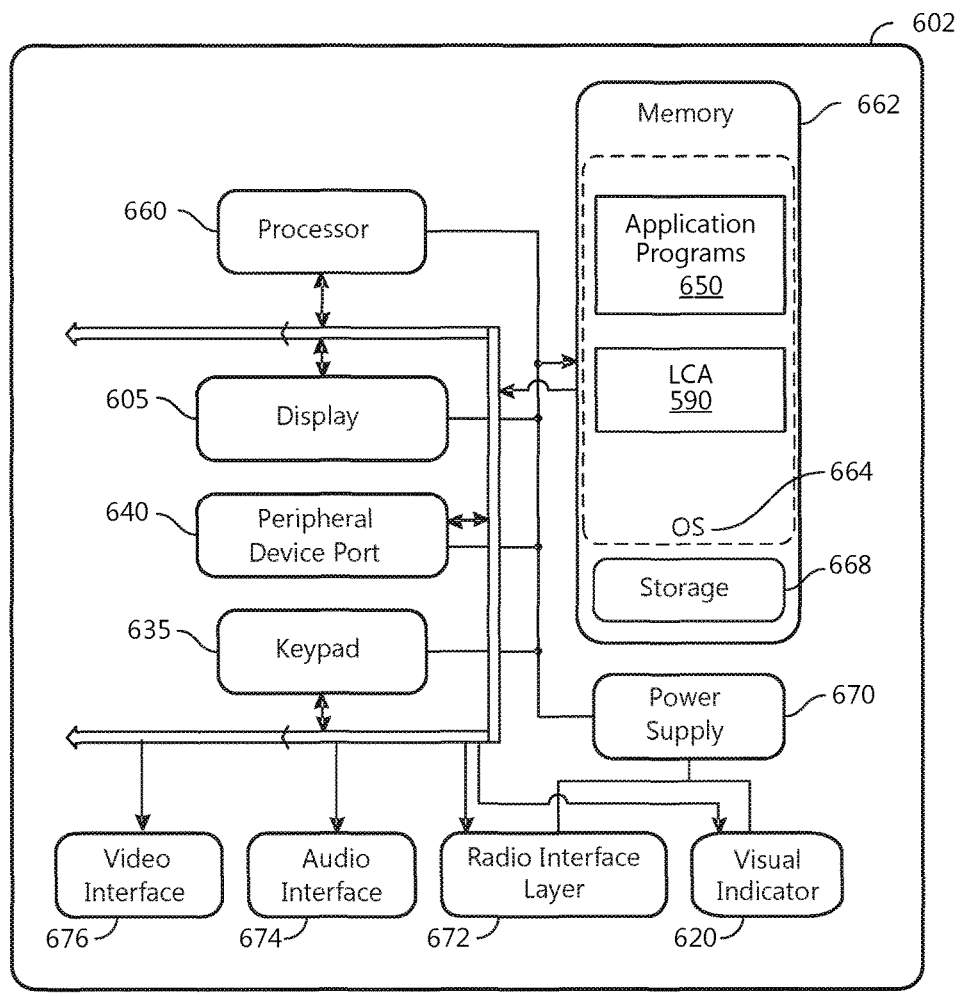
Figure 7:
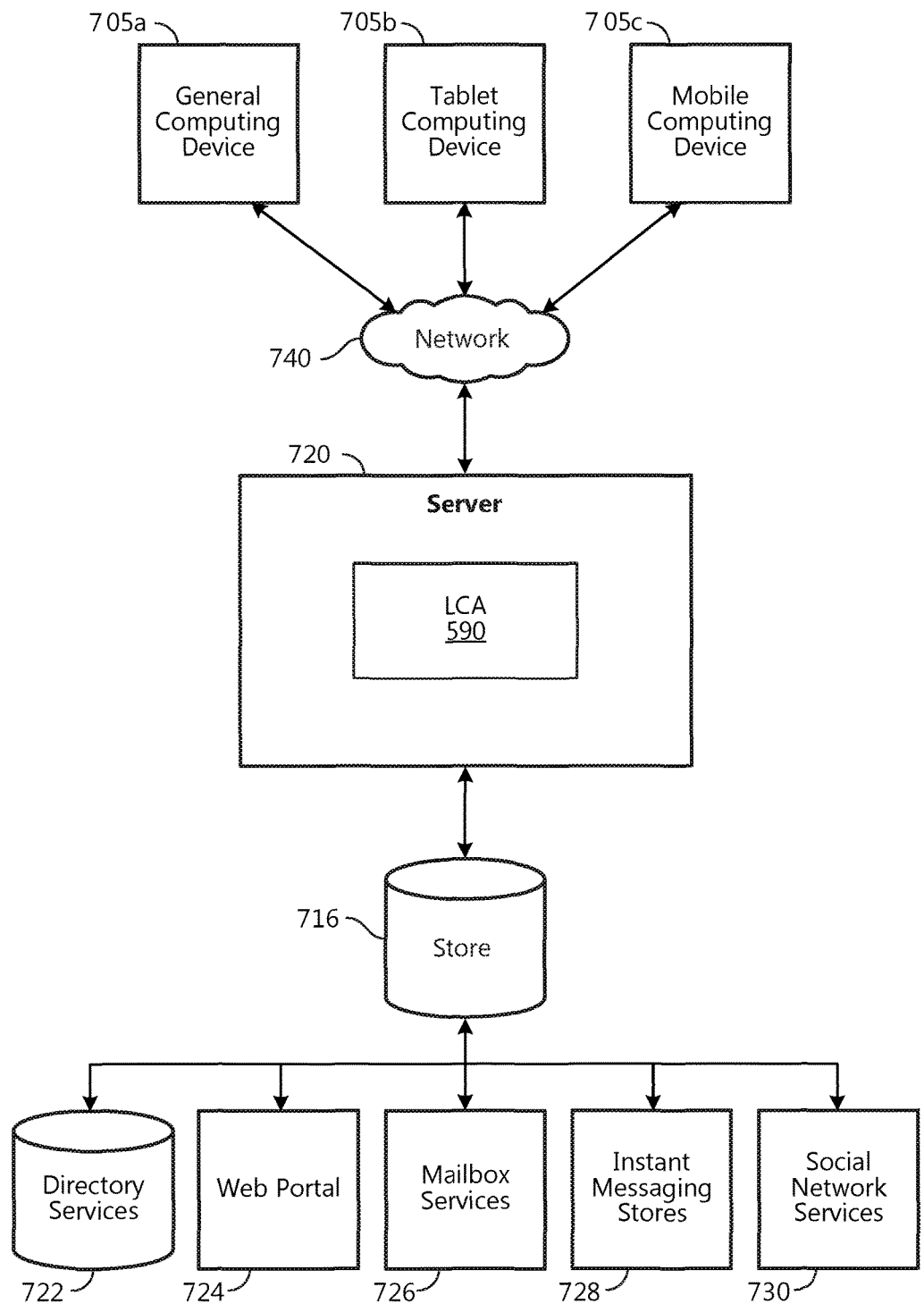
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes applications for enabling the user devices 120 to communicate with the communication server 110 or for the communication server 110 to provide mobile localized communications as described herein as part of a localized communication application (LCA) 590. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., applications 550, LCA 590) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, applications for enabling the user devices 120 to communicate with the communication server 110 or for the communication server 110 to provide mobile localized communications such as an LCA 590 as described herein are loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated such data/information are accessible via the mobile computing device 600 via the radio 672 or via a distributed computing network. Similarly, according to an aspect, such data/information are readily transferred between computing devices for storage and use according to well-known data/information transfer and storage means, including electronic mail and collaborative data/information sharing systems.

FIG. 7 illustrates one example of the architecture of a system for enabling mobile localized conversations as described above. Content developed, interacted with, or edited in association with mobile localized conversations is enabled to be stored in different communication channels or other storage types. For example, various documents/conversations may be stored using a directory service 722, a web portal 724, a mailbox service 726, an instant messaging store 728, or a social networking site 730. The LCA 590 is operative to use any of these types of systems or the like for enabling mobile localized conversations, as described herein. According to an aspect, a server 720 provides the LCA 590 or conversations to clients 705a,b,c. As one example, the server 720 is a web server providing the LCA 590 over the web. The server 720 provides the LCA 590 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for enabling communication between a first non-stationary user device and a second non-stationary user device, wherein the first non-stationary user device has a first velocity and is moving through a first plurality of locations, and the second non-stationary user device has a second velocity and is moving through a second plurality of locations, the method comprising:
   receiving, at a communication server, a plurality of conversation communications from the first non-stationary user device;
   determining, via the communication server, that the second velocity and a changing current location from the second plurality of locations of the second non-stationary user device is consistent with the first velocity and a changing current location from the first plurality of locations of the first non-stationary user device;
   transmitting, via the communication server, the plurality of conversation communications from the first non-stationary user device to the second non-stationary user device while the second velocity and the changing current location from the second plurality of locations remain consistent with the first velocity and the changing current location from the first plurality of locations.

2. The method of claim 1, further comprising, transmitting, via the communication server, a notification, regarding a first conversation communication from the plurality of conversation communications, to the second non-stationary user device prior to transmitting the plurality of conversation communications.

3. The method of claim 1, wherein determining, via the communication server, that the second velocity and the changing current location from the second plurality of locations of the second non-stationary user device is consistent with the first velocity and the changing current location from the first plurality of locations of the first non-stationary user device includes determining that the second velocity and the changing current location from the second plurality of locations of the second non-stationary user device is consistent with the first velocity and the changing current location from the first plurality of locations of the first non-stationary user device for a pre-determined amount of time.

4. The method of claim 1, further comprising, polling, via the communication server, the second non-stationary user device to determine the changing current location of the second non-stationary user device.

5. The method of claim 1, further comprising,
   determining, via the communication server, that each of a plurality of non-stationary user devices has a velocity and is moving through a plurality of locations;
   determining, via the communication server, that the velocity and a changing current location from the plurality of locations of each of the non-stationary user devices is consistent with the first velocity and the changing current location from the first plurality of locations of the first non-stationary user device;
   subsequently clustering, via the communication server, the first non-stationary user device and the plurality of non-stationary user devices, wherein the clustering enables each of the plurality of non-stationary user devices to receive the plurality of conversation communications from the first non-stationary user device and transmit additional conversation communications to the first non-stationary user device and the others of the plurality of non-stationary user devices while the velocity and the changing current location from the plurality of locations of each of the non-stationary user devices remain consistent with one another.

6. The method of claim 1, wherein the changing current location and the second velocity of the second non-stationary user device being consistent with the changing current location and first velocity of the first non-stationary user device includes:
   the changing current location of the second non-stationary user device being within a predetermined distance from the changing current location of the first non-stationary user device; and
   the second velocity being within a predetermined velocity of the first velocity.

7. The method of claim 1, further comprising:
   receiving, at the communication server, from a stationary user device an intended plurality of locations and an intended velocity;
   determining, via the communication server, that the intended plurality of locations and the intended velocity is consistent with the first plurality of locations and first velocity of the first non-stationary user device; and
   transmitting, via the communication server, the plurality of conversation communications from the first non-stationary user device to the stationary user device while at least one of the plurality of intended locations remains consistent with a changing current location from the plurality of locations of the first user device and while the intended velocity of the stationary user remains consistent with the first velocity of the first non-stationary user device.

8. A system to enable communication between a first non-stationary user device and a second non-stationary user device, wherein the first non-stationary user device has a first velocity and is moving through a first plurality of locations, and the second non-stationary user device has a second velocity and is moving through a second plurality of locations, the system comprising:
   a communication server having a processor; and
   a memory storage device including instructions, which when executed by the processor cause the communication server to:
      receive a plurality of conversation communications from the first non-stationary user device;
      determine that the second velocity and a changing current location from the second plurality of locations of the second non-stationary user device is consistent with the first velocity and a changing current location from the first plurality of locations of the first non-stationary user device;
      transmit the plurality of conversation communications from the first non-stationary user device to the second non-stationary user device while the second velocity and the changing current location from the second plurality of locations remain consistent with the first velocity and the changing current location from the first plurality of locations.

9. The system of claim 8, wherein the communication server is further caused to transmit a notification, regarding a first conversation communication from the plurality of conversation communications, to the second non-stationary user device prior to transmitting the plurality of conversation communications.

10. The system of claim 8, wherein the determination that the second velocity and the changing current location from the second plurality of locations of the second non-stationary user device is consistent with the first velocity and the changing current location from the first plurality of locations of the first non-stationary user device includes determining that the second velocity and the changing current location from the second plurality of locations of the second non-stationary user device is consistent with the first velocity and the changing current location from the first plurality of locations of the first non-stationary user device for a predetermined amount of time.

11. The system of claim 8, wherein the communication server is further caused to poll the second non-stationary user device to determine the changing current location of the second non-stationary user device.

12. The system of claim 8, wherein the communication server is further caused to:
 determine that each of a plurality of non-stationary user devices has a velocity and is moving through a plurality of locations;
 determine that the velocity and a changing current location from the plurality of locations of each of the non-stationary user devices is consistent with the first velocity and the changing current location from the first plurality of locations of the first non-stationary user device; and
 subsequently cluster the first non-stationary user device and the plurality of non-stationary user devices, wherein the clustering enables each of the plurality of non-stationary user devices to receive the plurality of conversation communications from the first non-stationary user device and transmit additional conversation communications to the first non-stationary user device and the others of the plurality of non-stationary user devices while the velocity and the changing current location from the plurality of locations of each of the non-stationary user devices remain consistent with one another.

13. The system of claim 8, wherein the changing current location and the second velocity of the second non-stationary user device being consistent with the changing current location and first velocity of the first non-stationary user device includes:
 the changing current location of the second non-stationary user device being within a predetermined distance from the changing current location of the first non-stationary user device; and
 the second velocity being within a predetermined velocity of the first velocity.

14. The system of claim 8, wherein the communication server is further caused to:
 receive from a stationary user device an intended plurality of locations and an intended velocity;
 determine that the intended plurality of locations and the intended velocity is consistent with the first plurality of locations and first velocity of the first non-stationary user device; and
 transmit the plurality of conversation communications from the first non-stationary user device to the stationary user device while at least one of the plurality of intended locations remains consistent with a changing current location from the plurality of locations of the first user device and while the intended velocity of the stationary user remains consistent with the first velocity of the first non-stationary user device.

15. A method for enabling communications via a communication server, the method comprising:
 determining a first velocity and a first location of a first user device;
 establishing localization settings based on the first velocity and the first location;
 receiving a plurality of conversation communications from the first user device; and
 while the first velocity is consistent with the localization settings and the first user device moves through a plurality of new locations:
  transmitting the plurality of conversation communications to a second user device when the second user device has a second velocity consistent with the localization settings and a second location that moves through a plurality of locations consistent with plurality of new locations of the first user device; and
  receiving from a second user device and transmitting to the first user device a plurality of replies to the conversation communications when the second user device has a second velocity consistent with the localization settings and a second location that moves through the plurality of locations consistent with plurality of new locations of the first user device.

16. The method of claim 15, wherein the localization settings include: a time and a route, and wherein the time and the route enable the first user device to specify the plurality of new locations and the first velocity of the first user device independently of a physical location and a physical velocity of the first user device.

17. The method of claim 15, wherein the localization settings include a transmission range applicable to the plurality of conversation communications from the first user device.

18. The method of claim 15, wherein the plurality of conversation communications include one or more of: text, a hyperlink and inserted content.

19. The method of claim 15, wherein the second user device comprises a bot.

* * * * *